United States Patent [19]

Yano et al.

[11] Patent Number: 4,856,006
[45] Date of Patent: Aug. 8, 1989

[54] HIGHER HARMONIC GENERATING DEVICE

[75] Inventors: Seiki Yano, Kashihara; Toshiki Hijikata, Nara, both of Japan

[73] Assignee: Sharp Kabushiki Kaisha, Osaka, Japan

[21] Appl. No.: 83,352

[22] Filed: Aug. 11, 1987

[30] Foreign Application Priority Data

Aug. 11, 1986 [JP] Japan .................. 61-188201

[51] Int. Cl.⁴ ............................. H01S 3/10
[52] U.S. Cl. ........................ 372/22; 372/21; 372/96; 307/427
[58] Field of Search ............ 372/21, 22, 26, 96; 307/427

[56] References Cited

U.S. PATENT DOCUMENTS

| | | | |
|---|---|---|---|
| 3,619,795 | 11/1971 | Marcatili | 307/427 |
| 3,619,796 | 11/1971 | Seidel . | |
| 3,700,912 | 10/1972 | Glass et al. | 307/427 |
| 3,822,927 | 7/1974 | Zernicke | 307/427 |
| 3,832,567 | 8/1974 | Jacques et al. | 307/427 |
| 3,842,289 | 10/1974 | Yariv et al. | 307/430 |
| 3,863,063 | 1/1975 | Indig et al. | 350/96.3 |
| 3,873,825 | 3/1975 | Jones et al. | 372/26 |
| 3,884,549 | 5/1975 | Wang et al. | 372/96 |
| 3,891,302 | 6/1975 | Darby et al. | 350/96.19 |
| 3,939,439 | 2/1976 | Fletcher et al. | 350/96.19 |
| 4,039,249 | 8/1977 | Kaminow et al. | 350/96.19 |
| 4,227,769 | 10/1988 | Phillips et al. | 350/96.19 |
| 4,250,465 | 2/1981 | Leib | 372/21 |
| 4,382,660 | 5/1983 | Pratt, Jr. et al. | 378/10 |
| 4,427,260 | 1/1984 | Peuch et al. | 307/427 |
| 4,493,086 | 1/1985 | Jain et al. | 372/21 |
| 4,655,547 | 4/1987 | Heritage et al. | 350/162.12 |
| 4,673,257 | 6/1987 | Rokni et al. | 372/9 |

FOREIGN PATENT DOCUMENTS 60-17727  6/1985  Japan .

Primary Examiner—Léon Scott, Jr.
Attorney, Agent, or Firm—Birch, Stewart, Kolasch & Birch

[57] ABSTRACT

A semiconductor harmonic generating device comprising a nonlinear medium and a waveguide which is provided in the upper face of the nonlinear medium. A higher harmonic laser light from a fundamental wave laser light which passes through the waveguide, wherein the waveguide has refractive index dispersion means for counterbalancing the refractive index difference caused by wavelength dispersion, occurring in the nonlinear medium, between the fundamental wave laser light and the higher harmonic laser light.

8 Claims, 2 Drawing Sheets

HIGHER HARMONIC GENERATING DEVICE

BACKGROUND OF THE INVENTION

The present invention relates to a higher harmonic generating device that is used for optical disks, measurement systems and the medical field. The device generates a laser light of a short wavelength that is convered from a fundamental wave laser light having a specific wavelength.

A method which generates a higher harmonic by using a nonlinear medium in order to generate a short wavelength laser light from a laser light having a specific wavelength is well known. That is, the higher harmonic laser light is generated by matching its phase with the incident fundamantal wave using an ordinary ray and/or an extraordinary ray. However, in the above conventional generating device, it is difficult to match the phases between the higher harmonic laser light and the incident fundamental valve because the phase velocity is matched by the angle regulation of the incident ray (the fundamental wave) and the temperature control of the nonlinear medium. Thus, the higher harmonic laser light is not easy to generate at a low cost.

SUMMARY OF THE INVENTION

In view of the prior art described above, an object of the present invention is to provide a higher harmonic generating device capable of easily matching the phases between the higher harmonic laser light and the incident fundamental wave without the complicated angle regulation and temperature control.

The higher harmonic generating device of the present invention comprises a nonlinear medium and a waveguide which has refractive index dispersion means for counterbalancing the refractive index difference caused by wavelength dispersion between the fundamental wave laser light and the higher harmonic laser light which is generated in the nonlinear medium.

Briefly described, the higher harmonic laser light is generated when the incident fundamental wave laser light having a specific wavelength passes through the waveguide in the nonlinear medium. Therefore, the higher harmonic generating device of the present invention is easily capable of phase matching and obtaining a short wavelength laser light of a high conversion rate and at low cost.

BRIEF DESCRIPTION OF THE DRAWINGS

The preferred embodiments will become more fully understood from the detailed description given hereinbelow and the accompanying drawings which are given by way of illustration only, and thus are not limitative of the present invention wherein.

DESCRIPTION OF THE PREFERRED EMBODIMENTS

Figure 1:
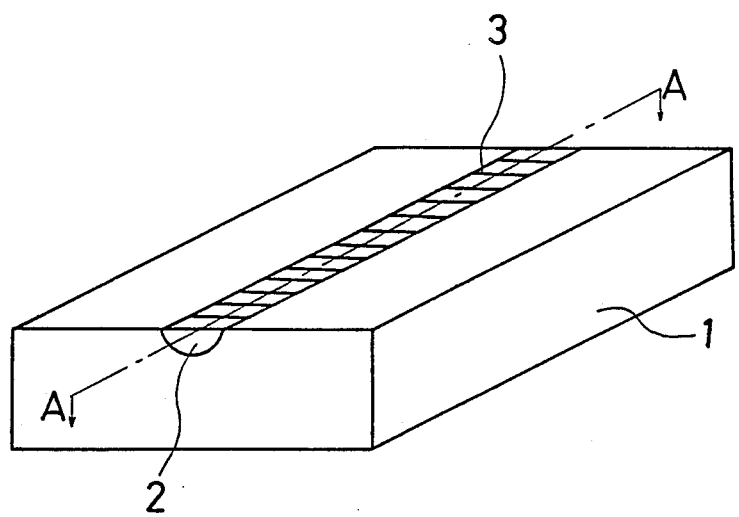
FIG. 1 is a schematic perspective view of a preferred embodiment of the present invention.
Figure 2:
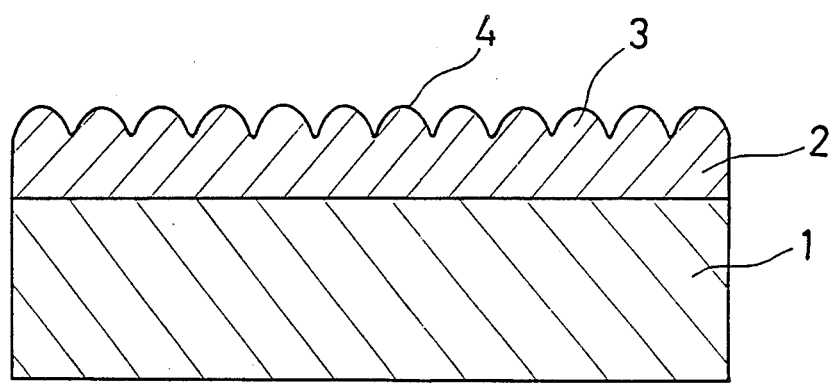
FIG. 2 is an end view taken substantially along the line A—A of FIG. 1.
Figure 3A:
FIG. 3(A) is an explanatory drawing showing luminous intensity distribution of the fundamental wave laser light.
Figure 3B:
FIG. 3(B) is an explanatory drawing showing luminous intensity distribution of the second higher harmonic laser light.
Figure 3C:
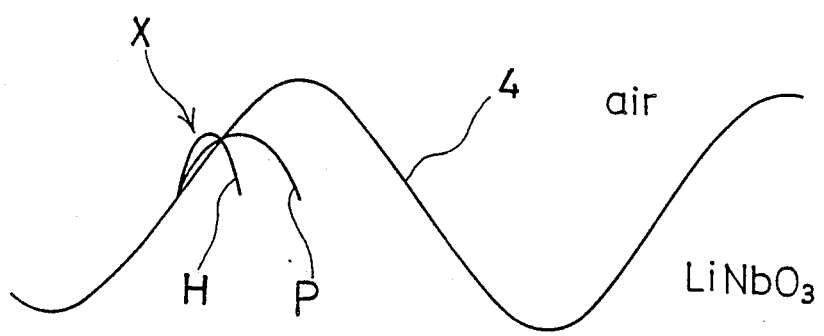
FIG. 3(C) is a type of diagram showing refractive index distributions caused by 1 diffraction grating between the fundamental wave laser light and the second higher harmonic laser light.

In FIGS. 1 and 2, the numeral 1 is a nonlinear medium 1, such as is made of a monocrystal of $LiNbO_3$ and is formed in the shape of rectangular parallelopiped. A waveguide 2 made from the diffusion of Ti is provided by an expansion in the same direction as a crystallographic axis of the nonlinear medium 1 in the upper face of medium 1. As shown in FIG. 2, the upper face of the waveguide 2 consists of projections 3 having a specific of pitch length and the diffraction grating 4 which provides the refractive index distribution, as a refractie index dispersion means. The projections 3 forming continued waveforms are provided in the direction of a crystallographic axis of the nonlinear medium 1. A Bragg condition is satisfied because the pitch of the diffraction grating 4 is the same as the wavelength of a fundamental wave laser light incident into the waveguide 2. In the above embodiment, if the semiconductor laser array having an oscillation wavelength of 780 nm is used as a light source of the fundamental wave, because the nonlinear medium 1 is made of $LiNbO_3$, then the refractive index from the fundamental wave laser light and the second higher harmonic laser light differs significantly. Therefore, the wavelength dispersion of the refractive index is 2.26 for the fundamental wave laser light P having a wavelength of 780 nm and is 2.4 for the second higher harmonic laser light H having a wavelength of 390 nm. As shown in FIGS. 3(A) and 3(B), the luminous intensity distribution of the fundamental wave laser light P differs from that of the second harmonic laser light H. Thus, the effective refractive index distribution occurring from the diffraction grating 4 produces the difference between the fundamental wave laser light P and the second harmonic laser light H. This difference is indicated with an arrow X in FIG. 3(C). The effective refractive index of the second higher harmonic wave laser light drops significantly because the second higher harmonic laser light H is more influenced by thre air which has a smaller refractive index than the fundamental wave laser light. Therefore, the difference of the refractive index caused by the wavelength dispersion can be easily counterbalanced, and the matching phase conditions between the fundamental wave laser light P and the second higher harmonic laser light H can be satisfied. As a result, a high conversion efficiency can be obtained between the fundamental wave laser light P and the second higher harmonic laser light H (according to the preferred embodiment of the present invention). In this embodiment, because the higher harmonic laser light is generated by using the the fundamental wave laser light and the second higher harmonic laser light between, so that the nonlinear constant is one order of magnitude is greater than the between them, which the nonlinear constant is one-figure greater comparing to the conventional method for matching the phase using the ordinary ray or the extraordinary ray. Specifically, 10 mW of the second higher harmonic laser light is obtained when the light source of the fundamental wave laser light is 100 mW, and the length of a waveguide is 100 um.

While only certain embodiments of the present invention have been described, it will be apparent to those skilled in the art that various changes and modifications may be made therein without departing from the spirit and scope of the present invention as claimed.

What is claimed is:

1. A higher harmonic generating device for developing a higher harmonic laser light corresponding to a first refractive index friom an incident fundamental wave laser light corresponding to a second refractive index comprising:
   nonlinear medium means for receiving the incident fundamental wave laser light;
   waveguide means disposed within said nonlinear medium means for developing the higher harmonic laser light in response to the incident fundamental wave laser light; and
   diffraction grating means formed directly in said waveguide means for counterbalancing a difference between the first refractive index and the second refractive index and wavelength dispersion resulting from said difference, thereby generating matching phases of the higher harmonic laser light and the incident fundamental wave laser light.

2. A higher harmonic generating device according to claim 1, wherein said nonlinear medium means comprises $LiNbO_3$.

3. A higher harmonic generating device according to claim 1, wherein an upper surface of said waveguide means comprises a plurality of projections which are located in the direction of a crystallographic axis of said nonlinear medium means.

4. A higher harmonic generating device according to claim 3, wherein said plurality of projections are formed in the direction of said crystallographic axis of said nonlinear medium means.

5. A higher harmonic generating device according to claim 3, wherein said plurality of projections have a predetermined pitch length.

6. A higher harmonic generating device according to claim 5, wherein said predetermined pitch length of said diffraction grating means is substantially equal to a wavelength of said incident fundamental wave laser light, for developing a Bragg condition.

7. A higher harmonic generating device according to claim 3, wherein said waveguide means comprises Ti which is diffused into said nonlinear medium means along a crystallographic axis of said nonlinear medium means.

8. A higher harmonic generating device according to claim 1, wherein said nonlinear medium means is formed in a rectangular parallelopiped shape.

* * * * *